US008134922B2

(12) United States Patent
Elangovan et al.

(10) Patent No.: US 8,134,922 B2
(45) Date of Patent: Mar. 13, 2012

(54) REDUCING FLOODING IN A BRIDGED NETWORK

(75) Inventors: Anusankar Elangovan, San Francisco, CA (US); Michael R. Smith, San Jose, CA (US); Timothy J. Kuik, Lino Lakes, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/209,622

(22) Filed: Sep. 12, 2008

(65) Prior Publication Data

US 2010/0067374 A1  Mar. 18, 2010

(51) Int. Cl.
*G01R 31/08* (2006.01)

(52) U.S. Cl. .................................................. 370/230.1

(58) Field of Classification Search ............... 370/395.4, 370/203, 229–240, 254–258, 298–306, 351–366, 370/386–393, 395.1, 395.3, 395.52, 395.54, 370/400–411, 498
See application file for complete search history.

(56) References Cited

U.S. PATENT DOCUMENTS

| 6,115,379 | A | 9/2000 | Flanders et al. | |
|---|---|---|---|---|
| 7,031,342 | B2 | 4/2006 | Teng | |
| 7,116,672 | B1* | 10/2006 | Sivakumar | 370/395.4 |
| 7,346,057 | B2* | 3/2008 | Foschiano et al. | 370/392 |
| 2002/0150056 | A1* | 10/2002 | Abadi et al. | 370/256 |
| 2003/0123462 | A1* | 7/2003 | Kusayanagi | 370/401 |
| 2003/0163554 | A1* | 8/2003 | Sendrowicz | 709/220 |
| 2005/0063395 | A1* | 3/2005 | Smith et al. | 370/399 |
| 2005/0083949 | A1* | 4/2005 | Dobbins et al. | 370/395.53 |
| 2005/0259646 | A1* | 11/2005 | Smith et al. | 370/389 |
| 2007/0058646 | A1 | 3/2007 | Hermoni | |
| 2008/0095160 | A1* | 4/2008 | Yadav et al. | 370/390 |
| 2008/0123676 | A1 | 5/2008 | Cummings et al. | |
| 2009/0080345 | A1* | 3/2009 | Gray | 370/255 |
| 2009/0135722 | A1* | 5/2009 | Boers et al. | 370/236 |
| 2009/0219817 | A1* | 9/2009 | Carley | 370/235.1 |
| 2009/0290501 | A1* | 11/2009 | Levy et al. | 370/250 |

OTHER PUBLICATIONS

"UDP Broadcast Flooding," Internetworking Case Studies, Chapter 6, Cisco Systems, Inc., 11 pages, 2008.

* cited by examiner

*Primary Examiner* — Kwang B Yao
*Assistant Examiner* — Jung-Jen Liu
(74) *Attorney, Agent, or Firm* — The Law Office of Kirk D. Williams

(57) ABSTRACT

Disclosed are, inter alia, methods, apparatus, computer-storage media, mechanisms, and means associated with loss of reducing flooding in a bridged network, typically including a device directly connected to multiple upstream bridges. These bridges are configured such that the device receives broadcast/multicast traffic from a single interface of one of the bridges, while allowing unicast traffic over each of the communications links connecting the device to the bridges. In one configuration, the device implements virtual machine(s), each including a virtual network interface associated with a MAC address; and the directly connected bridges are configured, for each particular MAC address of these MAC addresses of the virtual interfaces, such that one and only one of the bridges will forward packets having the particular MAC address as its destination address over a communications link directly connected to the device.

26 Claims, 4 Drawing Sheets

REDUCING FLOODING IN A BRIDGED NETWORK

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Bridges, operating at the data link layer (layer 2), are generally used for connecting multiple local access networks (LANs). Bridges use source and destination Medium Access Control (MAC) address information to determine where to forward packets. In operation, a bridge maintains a data structure mapping MAC addresses to ports of the bridge. When the bridge receives a packet, the bridge inspects the destination MAC address and determines from the mapping data structure from which port to forward the packet. If the destination MAC address is not in the mapping data structure, the bridge broadcasts (or "floods") the packet out each port. When a reply is received from the destination node, the bridge updates the mapping data structure associating the packet's source MAC address with the port on which the packet was received (as this is the port to forward packets destined for that MAC address). After this mapping is established, future packets with a destination address of that MAC address are not broadcast to every port, but to its mapped port.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
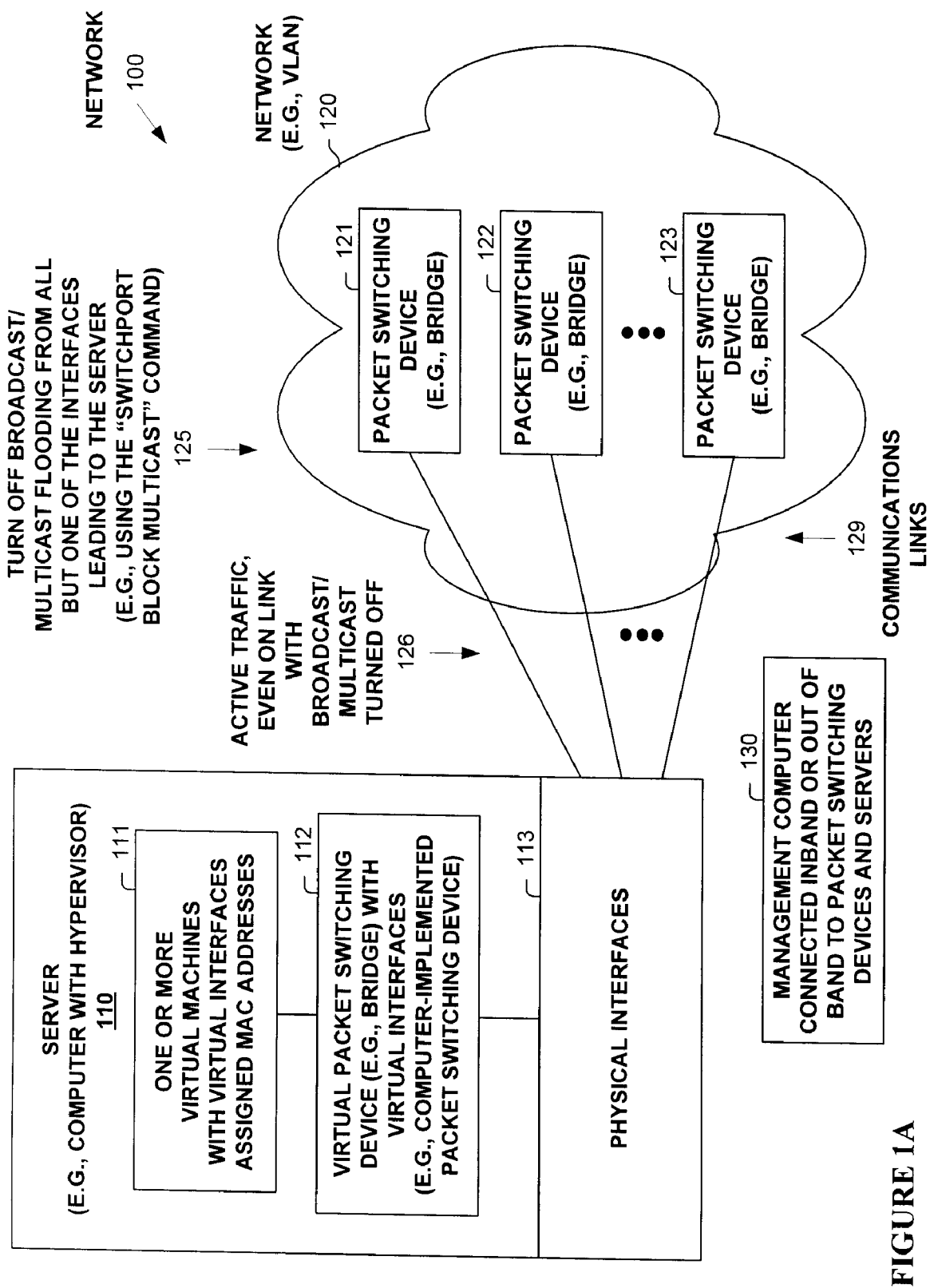
FIG. 1A illustrates a network operating according to one embodiment.

Disclosed are, inter alia, methods, apparatus, computer-storage media, mechanisms, and means associated with reducing flooding in a bridged network, typically including a device directly connected to multiple bridges. In one embodiment, all but a single one of these directly connected bridges are configured not to forward broadcast/multicast packets to the device, while allowing unicast packet traffic to be sent between the device and each of the bridges over the communications links directly connecting them to the device, and while allowing broadcast/multicast traffic to be received over one of the communications links from said particular one of the bridges. In one embodiment, the device implements virtual machine(s), each including a virtual network interface associated with a MAC address. In one embodiment, the directly connected bridges are configured, for each particular MAC address of these MAC addresses of the virtual interfaces, such that one and only one of the bridges will forward packets having the particular MAC address as its destination address over a communications link directly connected to the device.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Computer-readable media and means for performing methods and processing block operations are disclosed and are in keeping with the extensible scope and spirit of the invention. Note, nothing described or referenced in this document is admitted as prior art to this application unless explicitly so stated.

The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means associated with loss of reducing flooding in a bridged network, typically including a device directly connected to multiple upstream bridges. These bridges are configured such that the device receives broadcast/multicast traffic from a single interface of one of the bridges, while allowing unicast traffic over each of the communications links connecting the device to the bridges. In one configuration, the device implements virtual machine(s), each including a virtual network interface associated with a MAC address; and the directly connected bridges are configured, for each particular MAC address of these MAC addresses of the virtual interfaces, such that one and only one of the bridges will forward packets having the particular MAC address as its destination address over a communications link directly connected to the device.

One embodiment includes an apparatus, comprising: one or more physical interfaces configured to communicate with a plurality of bridges; and one or more processing elements configured to configure each of a plurality of bridges connected to a device over a plurality of communications links with no intervening bridges, such that only a particular bridge of the plurality of bridges is configured to forward broadcast packets to the device while allowing unicast packet traffic to be sent between the device and each of the plurality of bridges over the plurality of communications links. In one embodiment, said configuring of the plurality of bridges includes allowing only to particular bridge to forward multicast packets to the device.

One embodiment includes an apparatus, comprising: one or more physical interfaces configured to communicate with a plurality of bridges, with each of the bridges connected to a device over a plurality of communications links with no intervening bridges, with the device implementing one or more virtual machines with each including a virtual network interface associated with a different Medium Access Control (MAC) address, and with the device implementing a virtual bridge for switching packet traffic including between said virtual interfaces of said one or more virtual machines and the plurality of bridges; and one or more processing elements configured to configure all but a particular one of the plurality of bridges not to forward broadcast packets to the device while allowing unicast packet traffic to be sent between the device and each of the plurality of bridges over the plurality of communications links and allowing broadcast traffic to be received over one of the communications links from the particular one of the plurality of bridges.

In one embodiment, said configuring of not to forward broadcast packets also includes not to forward multicast traffic. In one embodiment, the virtual bridge is not running spanning tree protocol. In one embodiment, the virtual bridge is not a member of a bridge domain including the plurality of bridges.

One embodiment performs a method, comprising: configuring, by a control processor, all but a particular one of a plurality of bridges connected to a device over a plurality of communications links with no intervening bridges, not to forward broadcast packets to the device, while allowing unicast packet traffic to be sent between the device and each of the plurality of bridges over the plurality of communications links and allowing broadcast traffic to be received over one of the communications links from the particular one of the plurality of bridges.

In one embodiment, said configuring of not to forward broadcast packets also includes not to forward multicast traffic. One embodiment includes: implementing, in the device, one or more virtual machines with each including a virtual network interface associated with a different Medium Access Control (MAC) address; and implementing, in the device, a virtual bridge for switching packet traffic including between said virtual interfaces of said one or more virtual machines and the plurality of bridges. One embodiment includes configuring, by the control processor, the plurality of bridges to assign each of said MAC addresses to a single one of the plurality of bridges, such that for a particular MAC address of said MAC addresses, each bridge of the plurality of bridges not assigned the particular MAC address will not send unicast traffic having a destination MAC address of the particular MAC over one of the plurality of communications links to the device. In one embodiment, said configuring of not to forward broadcast packets also includes not to forward multicast traffic.

One embodiment includes an apparatus, comprising: one or more physical interfaces configured to communicate with a plurality of bridges, with each of the bridges connected to a device over a plurality of communications links with no intervening bridges, with the device implementing one or more virtual machines with each including a virtual network interface associated with a different Medium Access Control (MAC) address, and with the device implementing a virtual bridge for switching packet traffic including between said virtual interfaces of said one or more virtual machines and the plurality of bridges; and one or more processing elements configured to configure the plurality of bridges to assign each of said MAC addresses to a single one of the plurality of bridges, such that for a particular MAC address of said MAC addresses, each bridge of the plurality of bridges not assigned the particular MAC address will not send unicast traffic having a destination MAC address of the particular MAC over one of the plurality of communications links to the device.

In one embodiment, said one or more processing elements are configured to configure all but one of a plurality of bridges so as not to forward broadcast packets to the device, while allowing unicast packet traffic to be sent between the device and each of the plurality of bridges over the plurality of communications links. In one embodiment, said configuring of not to forward broadcast packets also includes not to forward multicast traffic.

One embodiment performs a method comprising: implementing a virtual bridge in a computer, with the computer including a plurality of physical network interfaces configured to communicate packets with a plurality of bridges external to the computer over a plurality of communications links with no intervening bridge, with only a single bridge of the plurality of bridges being configured to send broadcast and multicast packets over a single one of said communications links to the computer, and with the virtual bridge being configured to communicate packets with the plurality of network interfaces; implementing one or more virtual machines in the computer, with each of said virtual machines including a virtual network interface, with each of said virtual interfaces associated with a different Medium Access Control (MAC) address and coupled to the virtual bridge for communicating packets with the virtual bridge; and communicating packets between said one or more virtual machines and the plurality of bridges, including sending over each of the plurality of communications links.

One embodiment includes configuring, by a control processor, said bridges with said MAC addresses of said virtual machines, such that for each particular MAC address of said MAC addresses: one and only one of the plurality of bridges is configured to send packets with a destination address of said particular MAC address directly to the computer over a link of the plurality of communications links. In one embodiment, includes configuring, by the control processor, each particular bridge of the plurality of bridges that is not said single bridge using a command line interface on said particular bridge. In one embodiment, the control processor uses a PORT SECURITY command of the command line interface to said configure said bridges with said MAC addresses of said virtual machines. In one embodiment, the control processor resides in a computer external to the computer and the plurality of bridges. In one embodiment, in response to a specific virtual machine of said virtual machines being moved to a different computer with the specific virtual machine having said virtual network interface associated with a specific MAC address: updating, by the control processor, said bridge configured to send packets to said specific MAC address directly to the computer to revoke said configuration to allow sending of said packets with said specific MAC address to the different computer. In one embodiment, each of the plurality of bridges, but not the virtual bridge, runs a spanning tree protocol to discover a topology of a network including each of the plurality of bridges.

Expressly turning to the figures, FIG. 1A illustrates a network 100 operating according to one embodiment. As shown, network 100 includes a device 110 (e.g., a server/computer) directly connected to multiple bridges 121, 122, 123 over communications links 129. In one embodiment, device 110 and bridges 121-123 are part of virtual LAN (VLAN) 120.

In one embodiment, device 110 is a server, such as, but not limited to a computer with a hypervisor for implementing the virtual bridge/machine(s). Device 110 implements virtual bridge 112 and one or more virtual machines 111, and includes physical interfaces 113. A virtual machine is typically a virtual representation of a computer, complete with an operating system and potentially many processes. In one embodiment, VMware is used to implement virtual bridge 112 and one or more virtual machines 111.

Each of virtual machines 111 is assigned a MAC address, and virtual bridge 112 is configured for performing the communication/switching of packets among virtual machines 111 and physical interface 113 of device 110. Virtual bridge 112 typically does not run spanning tree protocol, and thus, virtual bridge 112 does not coordinate with bridges 121-123 about understanding the network topology in order to selectively shut down paths, such as to prevent forwarding loops. Therefore, in a standard configuration, bridges 121-123 will each send broadcast/multicast traffic to device 110.

One embodiment selectively configures (or the network is so configured) the broadcast/multicast sending of packets by bridges 121-123, such that only a single one of bridges 121-123 is configured to send broadcast/multicast traffic to device 110 and over a single one of communications links 129 (and configured not to send over multiple communications links to device 110), and the other bridges 121-123 are configured not to send broadcast/multicast traffic to device 110 (as indicated by annotated reference number 125). In one embodiment, these communications links are not turned off to prevent all traffic, but rather are configured to allow active unicast traffic (as indicated by annotated reference number 126).

One embodiment includes a management computer 130 which configures the multiple bridges 121, 122, 123 to operate as described herein. In one embodiment, management computer 130 communicates with bridges 121-123 via out-of-band communication (e.g., over a maintenance network or links); while in one embodiment, computer 130 communicates with bridges 121-123 via in-band signaling. In one embodiment, management computer 130 configures bridges 121-123 via the command line interface of each of the bridges, such as using the "SWITCHPORT BLOCK MULTICAST" command. In one embodiment, management computer 130 configures bridges 121-123 using a network management/configuration protocol. Note, in one embodiment, device 110 configures the multiple bridges 121, 122, 123 to operate as described herein.

Figure 1B:
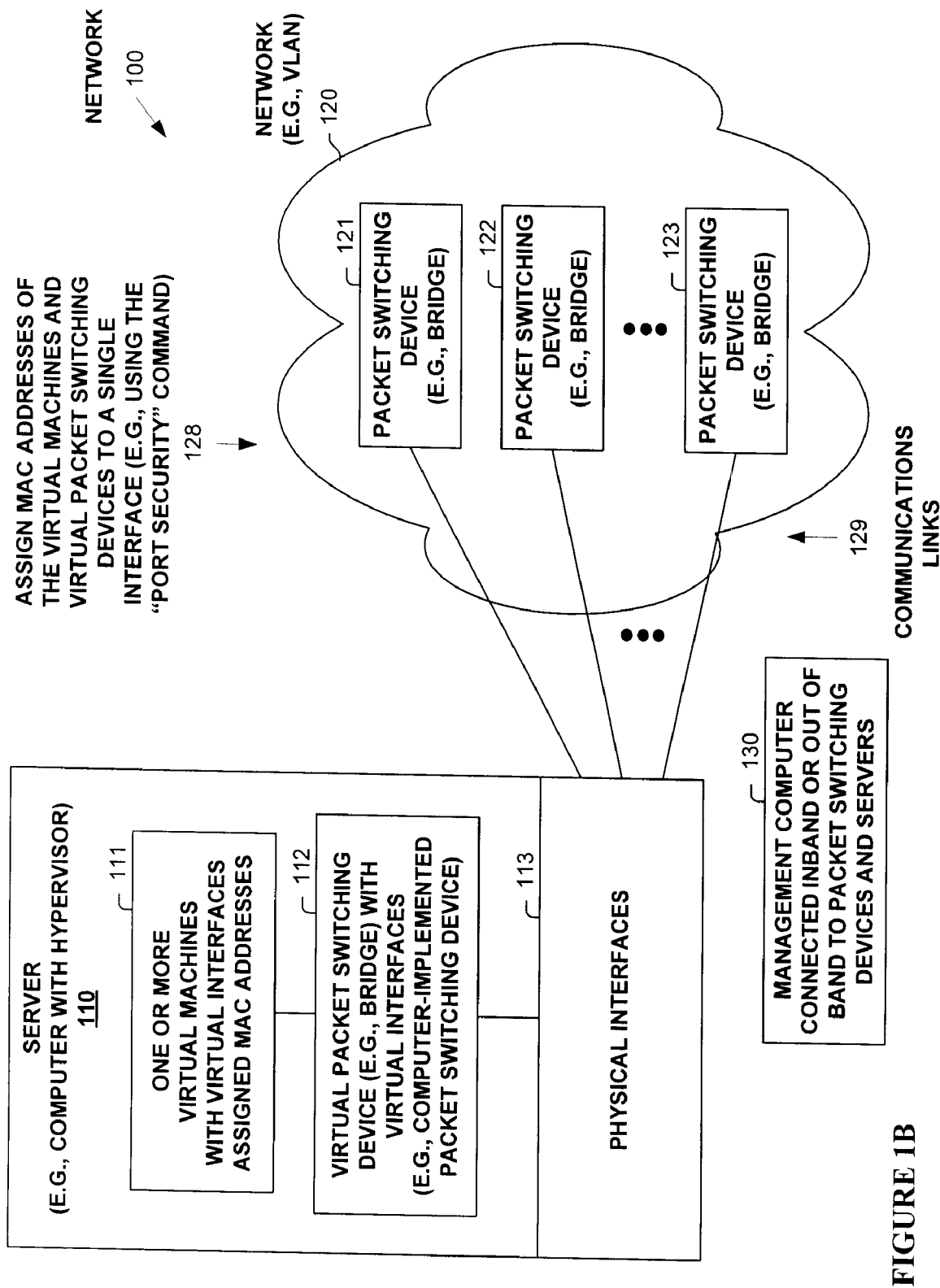
FIG. 1B illustrates a network operating according to one embodiment.

FIG. 1B illustrates another embodiment operating in network 100 of FIG. 1A, with network elements as described supra. In one embodiment, each MAC address of virtual machines 111 is assigned to a single interface of bridges 121-123, such that only that single interface is allowed to send traffic over communication link 129 (i.e., a link directly connecting device 110 with bridges 121-123), as illustrated by annotated reference number 128. In one embodiment, this assignment of MAC address to interfaces of the upstream bridges is performed to load balance packet traffic. Additionally, a communications link 129 could be an etherchannel or other aggregation of ports/communications links. In one embodiment, this configuration of bridges 121-123 is performed using the "PORT SECURITY" command.

Note, one embodiment operates, or is configured to operate, as discussed in relation to FIG. 1A (e.g., allowing broadcast/multicast over a single communications link of a directly connected upstream bridge) and/or discussed in relation to FIG. 1B (e.g., assigning each MAC address to a single interface connected to a communications link of a directly connected upstream bridge). Additionally, FIGS. 1A and 1B illustrate a single device 110 (e.g., server/computer), with its description being be directly extendable and applicable to networks including multiple devices 110.

Figure 2:
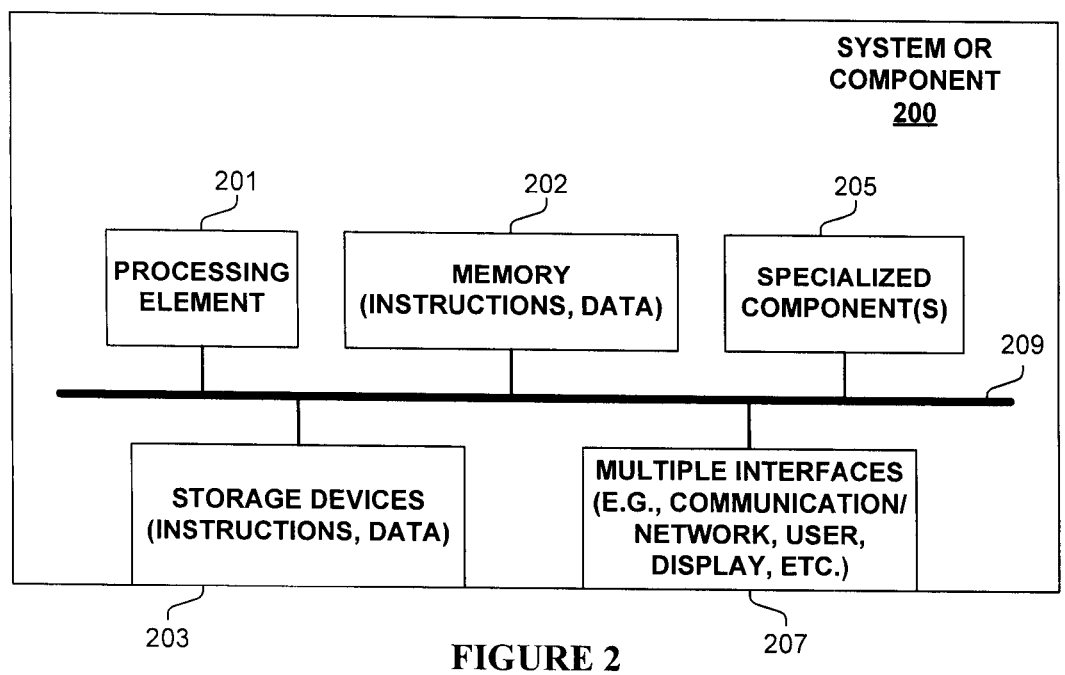
FIG. 2 illustrates an example system or component used in one embodiment.

FIG. 2 is a block diagram of a system or component 200 used in one embodiment. For example, in one embodiment, system or component 200 performs one or more processes corresponding to one of the flow diagrams illustrated or otherwise described herein. In one embodiment, system or component 200 corresponds to, or is a part of, device 110, management computer 130, and/or a bridge 121-123 of FIGS. 1A and/or 1B.

In one embodiment, system or component 200 includes a processing element 201, memory 202, storage devices 203, specialized components 205 (e.g. optimizing hardware for performing operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application.

Various embodiments of component 200 may include more or less elements. The operation of component 200 is typically controlled by processing element 201 using memory 202 and storage devices 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

Figure 3:
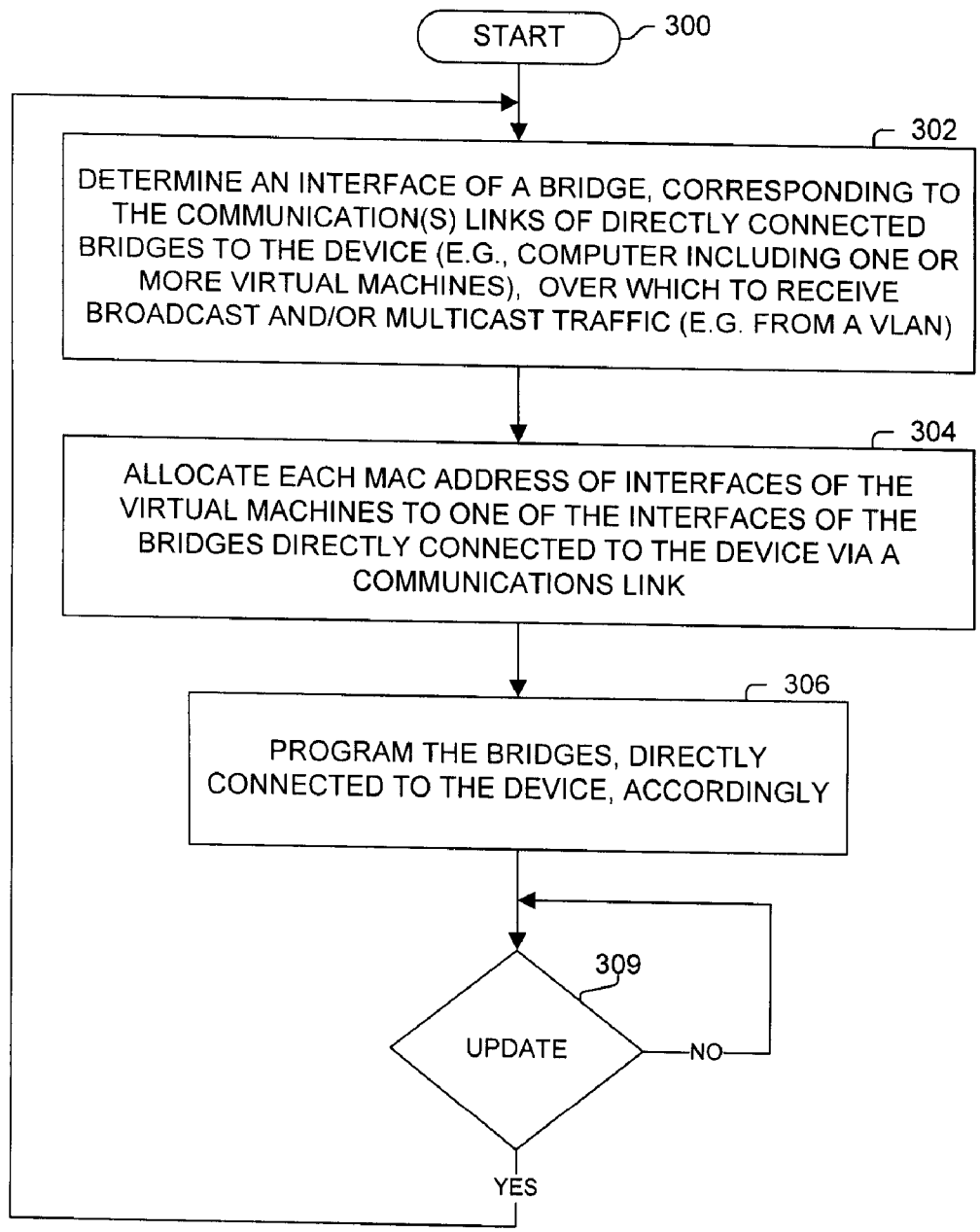
FIG. 3 illustrates a process performed in one embodiment.

FIG. 3 illustrates a process used in one embodiment, such as that performed by a management computer or device used to configure upstream bridges of a device (e.g., server/computer) implementing a virtual bridge and virtual machine(s). Processing begins with process block 300. In process block 302, an interface of a single directly connected bridge is selected for being the source of broadcast/multicast traffic for the device. In process block 304, each MAC address of the interfaces of the virtual machines is allocated to a single interface of a single directly connected upstream bridge. In one embodiment, the assignment of the MAC address of the interfaces of the virtual machines to the interfaces of the directly connected upstream bridges via the communications links are assigned so as to load balance or otherwise distribute the traffic across the communications links and interfaces of the directly connected upstream bridges.

In process block 306, the upstream bridges are configured accordingly to implement these policies. In one embodiment, such configuration is performed using the SWITCHPORT BLOCK MULTICAST and/or PORT SECURITY commands on the directly connected upstream bridges. Additionally, once the MAC addresses of the interfaces of the virtual machines are assigned to upstream link/interface of a directly connected bridge, unicast flooding can be, and typically is, disabled. Note, in one embodiment, only one of process blocks 302 and 304 is performed, while in one embodiment, both of process blocks 302 and 304 are performed.

Next, as determined in process block 309, if there is a change in topology (e.g., a communication link or bridge is added or removed, a virtual machine having a MAC address is moved to a different device, or is instantiated or terminated such as discovered using normal techniques, including, but not limited to, using Cisco Discovery Protocol), then configurations of the upstream bridges are adjusted accordingly, as represented by returning to process block 302.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
one or more physical interfaces configured to communicate with a plurality of bridges; and
memory and one or more processing elements configured to configure each of the plurality of bridges connected to a device over a plurality of communications links with no intervening bridges; wherein said configuring of the plurality of bridges results in only a particular bridge of the plurality of bridges being configured to forward broadcast packets to the device, while allowing unicast packet traffic to be sent between each of the plurality of bridges to the device over each of the plurality of communications links; wherein each of the plurality of bridges is communicatively coupled to the device over at least one communications link of the plurality of communications links different than one of the plurality communications links used by another of the plurality of bridges;
wherein each of the plurality of bridges is separate from both the apparatus and the device; and
wherein the device does not coordinate with any of the plurality of bridges to gain an understanding of a topology of a network including the plurality of bridges and the device.

2. The apparatus of claim 1, wherein said configuring of the plurality of bridges includes allowing only the particular bridge to forward multicast packets to the device.

3. A device, comprising:
a plurality of physical interfaces configured to communicate with a plurality of bridges over a different communications link with no intervening bridge, with the device implementing one or more virtual machines with each including a virtual network interface associated with a different Medium Access Control (MAC) address, and with the device implementing a virtual bridge for switching packet traffic including between said virtual interfaces of said one or more virtual machines and the plurality of bridges; and
memory and one or more processing elements configured to configure all but a particular one of the plurality of bridges not to forward broadcast nor multicast packets to the device while allowing unicast packet traffic to be sent between the device and each of the plurality of bridges over the plurality of communications links and allowing broadcast traffic to be received over one of the communications links from the particular one of the plurality of bridges;
wherein each of the plurality of bridges is separate from the device; and
wherein the virtual switch is not running spanning tree protocol.

4. The device of claim 3, wherein the virtual switch is not a member of a bridge domain including the plurality of bridges.

5. A method, comprising:
configuring, by a control processor included in a computer, all but a particular one of a plurality of bridges connected to a device over a plurality of communications links with no intervening bridges, not to forward broadcast packets to the device, while allowing unicast packet traffic to be sent between the device and each of the plurality of bridges over the plurality of communications links and allowing broadcast traffic to be received over one of the communications links from the particular one of the plurality of bridges;
implementing, in the device, one or more virtual machines with each including a virtual network interface associated with a different Medium Access Control (MAC) address; and
implementing, in the device, a virtual bridge for switching packet traffic including between said virtual interfaces of said one or more virtual machines and the plurality of bridges;
wherein each of the plurality of bridges is separate from both the computer and the device.

6. The method of claim 5, wherein said configuring of not to forward broadcast packets also includes not to forward multicast traffic.

7. The method of claim 5, comprising: configuring, by the control processor, the plurality of bridges to assign each of said MAC addresses to a single one of the plurality of bridges, such that for a particular MAC address of said MAC addresses, each bridge of the plurality of bridges not assigned the particular MAC address will not send unicast traffic having a destination MAC address of the particular MAC over one of the plurality of communications links to the device.

8. The method of claim 7, wherein said configuring of not to forward broadcast packets also includes not to forward multicast traffic.

9. A device, comprising:
a plurality of physical interfaces configured to communicate with a plurality of bridges over a different communications link with no intervening bridge, with the device implementing one or more virtual machines with each including a virtual network interface associated with a different Medium Access Control (MAC) address, and with the device implementing a virtual bridge for switching packet traffic including between said virtual interfaces of said one or more virtual machines and the plurality of bridges; and
memory and one or more processing elements configured to configure the plurality of bridges to assign each of said MAC addresses to a single one of the plurality of bridges, such that for a particular MAC address of said MAC addresses, each bridge of the plurality of bridges not assigned the particular MAC address will not send unicast traffic having a destination MAC address of the particular MAC over one of the plurality of communications links to the device; wherein said one or more processing elements are configured to configure all but one of a plurality of bridges so as not to forward broadcast packets to the device, while allowing unicast packet traffic to be sent between the device and each of the plurality of bridges over the plurality of communications links; and
wherein each of the plurality of bridges is separate from the device.

10. The device of claim 9, wherein said configuring of not to forward broadcast packets also includes not to forward multicast traffic.

11. A method, comprising:
implementing a virtual bridge in a server, with the server including a plurality of physical network interfaces configured to communicate packets with a plurality of bridges external to the server over a plurality of communications links with no intervening bridge, with only a single bridge of the plurality of bridges being configured to send broadcast and multicast packets over a single one of said communications links to the server, and with the virtual bridge being configured to communicate packets with the plurality of network interfaces;
implementing one or more virtual machines in the server, with each of said virtual machines including a virtual network interface, with each of said virtual interfaces associated with a different Medium Access Control (MAC) address and coupled to the virtual bridge for communicating packets with the virtual bridge;
configuring, by a control processor, said bridges with said MAC addresses of said virtual machines, such that for each particular MAC address of said MAC addresses: one and only one of the plurality of bridges is configured to send packets with a destination address of said particular MAC address directly to the server over a link of the plurality of communications links; and
communicating packets between said one or more virtual machines and the plurality of bridges through the virtual bridge, including sending over each of the plurality of communications links;
wherein each of the plurality of bridges is communicatively coupled to the server over at least one communications link of the plurality of communications links different than one of the plurality communications links used by another of the plurality of bridges; wherein the virtual bridge does not coordinate with any of the plurality of bridges to gain an understanding of a topology of a network including the plurality of bridges and the virtual bridge; and wherein the server is a computer operating the virtual bridge and said one or more virtual machines on top of a hypervisor.

12. The method of claim 11, including configuring, by the control processor, each particular bridge of the plurality of bridges that is not said single bridge using a command line interface on said particular bridge.

13. The method of claim 12, wherein the control processor uses a PORT SECURITY command of the command line interface to said configure said bridges with said MAC addresses of said virtual machines.

14. The method of claim 11, wherein the control processor resides in a computer external to the server and the plurality of bridges.

15. The method of claim 14, wherein, in response to a specific virtual machine of said virtual machines being moved to a different server with the specific virtual machine having said virtual network interface associated with a specific MAC address: updating, by the control processor, said bridge configured to send packets to said specific MAC address directly to the server to revoke said configuration to allow sending of said packets with said specific MAC address to the different server.

16. The method of claim 11, wherein each of the plurality of bridges, but not the virtual bridge, runs a spanning tree protocol to discover a topology of a network including each of the plurality of bridges.

17. The method of claim 11, wherein the virtual bridge does not runs a spanning tree protocol.

18. The apparatus of claim 1, wherein the apparatus is the device.

19. The apparatus of claim 1, wherein the device is separate from the apparatus.

20. The apparatus of claim 1, wherein the device implements one or more virtual packet switching devices communicatively coupled for exchanging packets to each of the plurality of bridges; wherein said one or more virtual packet switching devices do not coordinate with any of the plurality of bridges to gain an understanding of a topology of a network including the plurality of bridges and said one or more virtual packet switching devices.

21. The apparatus of claim 20, wherein none of said one or more virtual packet switching devices runs a spanning tree protocol to gain an understanding of the topology of the network including the plurality of bridges and said one or more virtual packet switching devices.

22. A method, comprising:
configuring, by a control processor included in a device, all but a particular one of a plurality of bridges connected to the device over a plurality of communications links with no intervening bridges, not to forward broadcast packets to the device, while allowing unicast packet traffic to be sent between the device and each of the plurality of bridges over the plurality of communications links and allowing broadcast traffic to be received over one of the communications links from the particular one of the plurality of bridges;

wherein each of the plurality of bridges is separate from the device; and wherein the device does not coordinate with any of the plurality of bridges to gain an understanding of a topology of a network including the plurality of bridges and the device.

23. The method of claim 22, wherein said configuring of not to forward broadcast packets also includes not to forward multicast traffic.

24. The method of claim 22, comprising:

implementing, in the device, one or more virtual machines with each including a virtual network interface associated with a different Medium Access Control (MAC) address; and implementing, in the device, a virtual bridge for switching packet traffic including between said virtual interfaces of said one or more virtual machines and the plurality of bridges.

25. The method of claim 24, comprising: configuring, by the control processor, the plurality of bridges to assign each of said MAC addresses to a single one of the plurality of bridges, such that for a particular MAC address of said MAC addresses, each bridge of the plurality of bridges not assigned the particular MAC address will not send unicast traffic having a destination MAC address of the particular MAC over one of the plurality of communications links to the device.

26. The method of claim 25, wherein said configuring of not to forward broadcast packets also includes not to forward multicast traffic.

* * * * *